United States Patent
Salice

(10) Patent No.: US 7,891,521 B2
(45) Date of Patent: Feb. 22, 2011

(54) CONTAINER FOR GIFTS

(75) Inventor: Giuseppe Salice, Arlon (BE)

(73) Assignee: Magic Production Group (M.P.G.) S.A., Senningerberg (LU)

( * ) Notice: Subject to any disclaimer, the term of this patent is extended or adjusted under 35 U.S.C. 154(b) by 760 days.

(21) Appl. No.: 10/595,657

(22) PCT Filed: Oct. 28, 2004

(86) PCT No.: PCT/EP2004/012203

§ 371 (c)(1),
(2), (4) Date: May 3, 2006

(87) PCT Pub. No.: WO2005/044677

PCT Pub. Date: May 19, 2005

(65) Prior Publication Data

US 2007/0199933 A1    Aug. 30, 2007

(30) Foreign Application Priority Data

Nov. 6, 2003    (EP) .................................. 03025289

(51) Int. Cl.
*B65D 41/16*    (2006.01)

(52) U.S. Cl. ..................... 220/788; 220/4.21; 220/4.25; 220/834; 220/838; 220/839; 426/132; 215/235

(58) Field of Classification Search ................ 220/4.21, 220/4.25, 788, 834, 838, 839; 426/132, 138; 215/235

See application file for complete search history.

(56) References Cited

U.S. PATENT DOCUMENTS

| | | | |
|---|---|---|---|
| 4,124,135 A | 11/1978 | Weder et al. | |
| 4,212,415 A * | 7/1980 | Neely | ............... 222/231 |
| 4,428,497 A | 1/1984 | Julius et al. | |
| 4,862,335 A | 8/1989 | Vadseth | |
| 5,417,339 A | 5/1995 | Liu | |
| 5,551,589 A * | 9/1996 | Nakamura | ............ 220/326 |
| 5,950,854 A * | 9/1999 | Rider et al. | ............ 220/4.23 |
| 2002/0008106 A1 * | 1/2002 | Bezek et al. | ........... 220/4.27 |

FOREIGN PATENT DOCUMENTS

| | | |
|---|---|---|
| EP | 1308392 A1 | 5/2003 |
| GB | 331693 | 7/1930 |
| GB | 2010221 A | 6/1979 |
| WO | 9300267 A1 | 1/1993 |

* cited by examiner

*Primary Examiner*—Anthony Stashick
*Assistant Examiner*—Elizabeth Volz
(74) *Attorney, Agent, or Firm*—Rothwell, Figg, Ernst & Manbeck, P.C.

(57) ABSTRACT

A container for gifts or the like, of the type that is used for association with a food package, in particular, to be inserted in a chocolate egg, comprises two half-shells which can be coupled mouth to mouth and with which are associated connection means that can be mutually engaged in order to keep the two half-shells connected to one another; the connection means are preferably of the buckle type with a male element integral with one half-shell and a female element integral with the other half-shell, the male and female elements being mutually engageable.

6 Claims, 2 Drawing Sheets

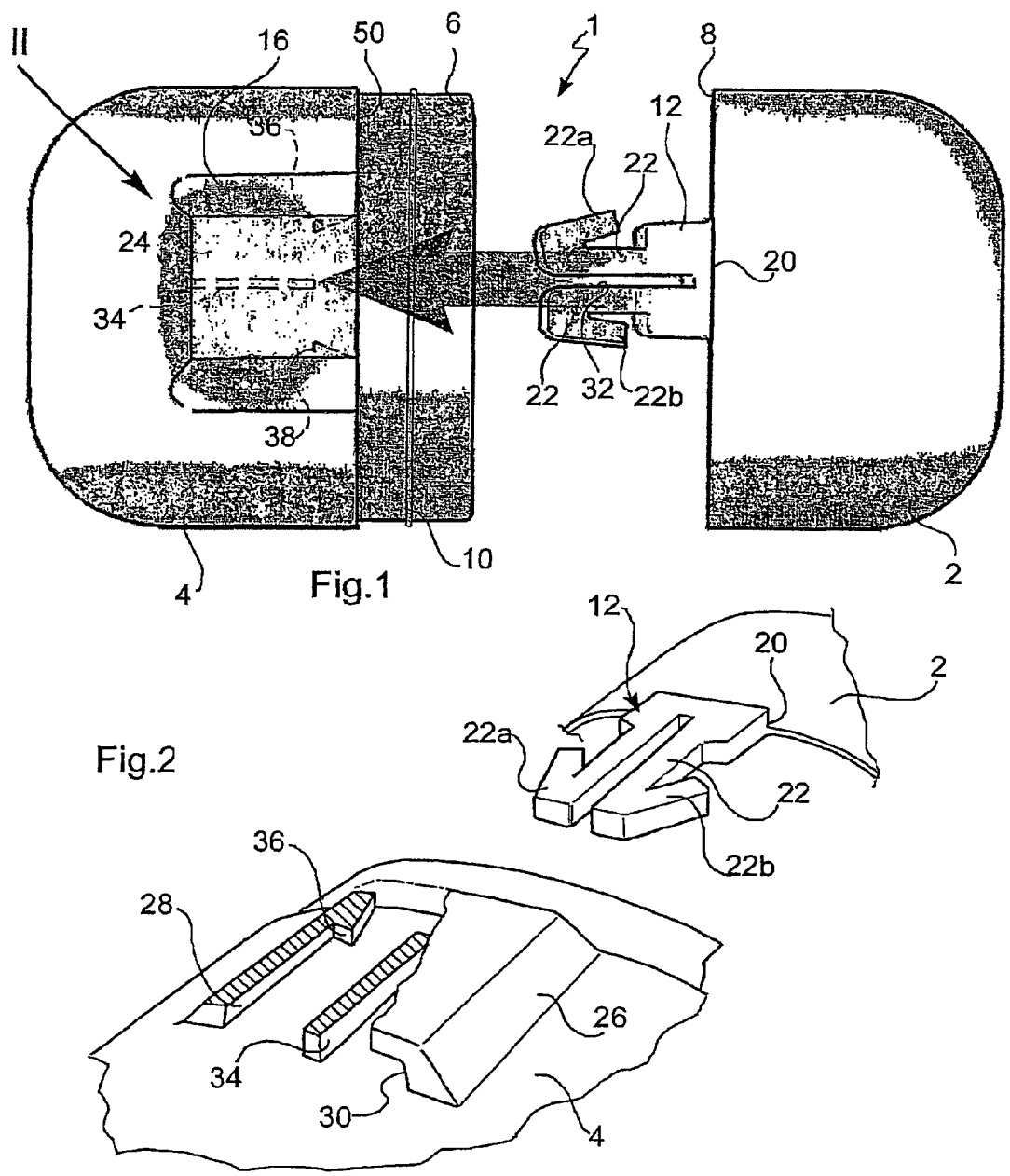

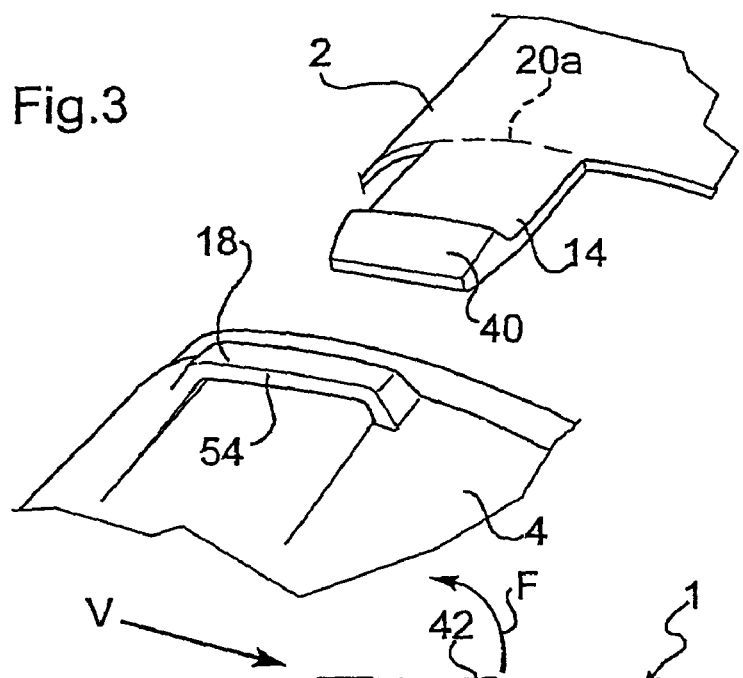
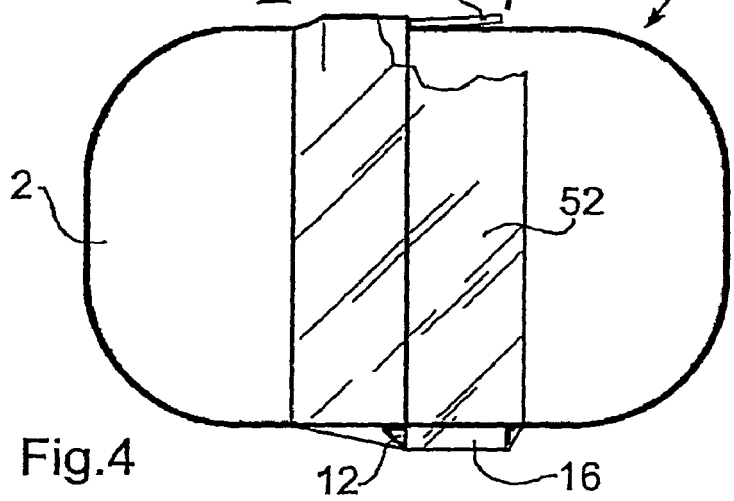
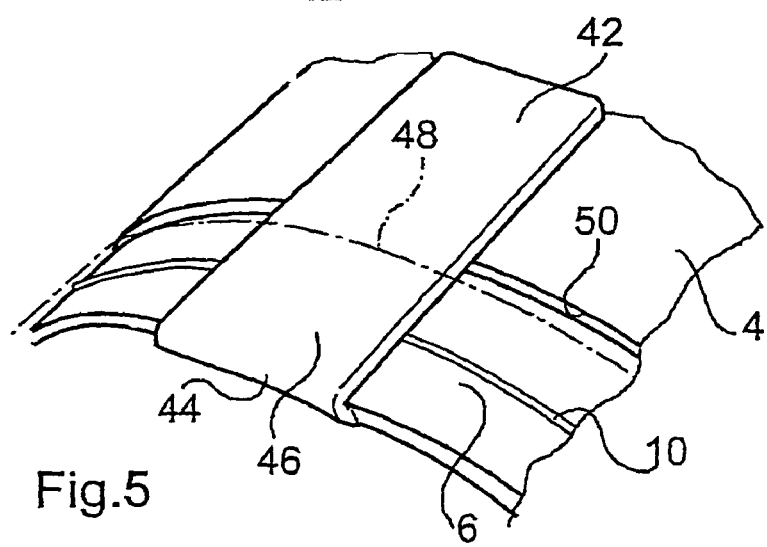

CONTAINER FOR GIFTS

CROSS REFERENCE TO RELATED APPLICATION

This application is a 35 U.S.C. §371 National Phase Entry Application from PCT/EP2004/012203, filed Oct. 28, 2004, and designating the U.S.

BACKGROUND OF THE INVENTION

1. Field of the Invention

The present invention relates to a container for gifts which is intended to be used, for example, for the insertion of gifts such as small toys or confectionery products, and to be inserted in a hollow body made of a food substance, such as a chocolate egg, or in a package comprising a food substance.

2. Description of the Related Art

In particular, the invention relates to a container of the type described in WO-A-93/00267 or in EP-A-1 308 392, comprising two half-shells the mutually facing mouths of which can be connected to one another by a form fit or by snap engagement to form a closed shell which can be opened by the consumer in order to extract therefrom the gift or so-called "surprise" contained therein.

SUMMARY OF THE INVENTION

The object of the invention is to provide a novel container of the type indicated above which has improved characteristics of use by the consumer, typically a child, such as, for example, greater compactness and ease of handling, so as to be easier and more convenient to use and reuse.

In view of these objects, a subject of the invention is a container as defined in the appended claims.

Another object of the invention which is defined in the claims is a package made of a food product such as, for example, a chocolate-egg package, containing a container including a gift or surprise according to the first subject of the invention.

BRIEF DESCRIPTION OF THE DRAWINGS

Further characteristics and advantages of the invention will become clear from the following detailed description, which is given with reference to the appended drawings which are provided by way of non-limiting example and in which:

FIG. 1 is an exploded front view of a container according to the invention,

FIG. 2 is a fragmentary perspective view of a detail of FIG. 1, taken on the arrow 11, FIG. 3 is an exploded, perspective view which shows a variant of the detail of FIG. 2, also from the viewpoint of the arrow 11, FIG. 4 is a front elevational view of a container of the type shown in FIG. 1 in the closed configuration, and FIG. 5 is a perspective view of a detail of one of the two half-shells of the container of FIG. 4, taken generally on the arrow V of FIG. 4.

DETAILED DESCRIPTION OF THE INVENTION

With reference to the drawings, a container according to the invention, generally indicated 1, comprises a first half-shell and a second half-shell 2, 4, generally made of injection-moulded or thermoformed plastics material.

Although, in the drawings, the two half-shells have a configuration generally corresponding to that illustrated in WO93/00267, in which each half-shell has a rounded, dome-shaped end portion and an adjacent, generally cylindrical skirt portion, the constructional principle of the invention is intended to be applicable to half-shells of different configurations.

The two half-shells can be coupled mouth to mouth by mutual engagement means constituted, for example, by a collar 6 which is carried by one of the half-shells and which can engage the mouth portion 8 of the other half-shell. To promote a firm connection between the two half-shells, form-fit or snap-engagement means are provided and are constituted, for example, by an annular rib 10 which engages a corresponding annular groove (not visible in the drawings) formed on the internal wall of the mouth portion of the other half-shell. It is intended that other engagement means may be used, provided that they are suitable for ensuring a connection which is firm but which can be released easily by the user.

According to the principal characteristic of the invention, connection means are associated with each of the two half-shells and can engage one another in order to keep the two half-shells connected to one another even when the container is in the open configuration.

Preferably, when the connection means are in mutual engagement, they are arranged and configured in a manner such as to permit a movement, with limited travel, of one half-shell relative to the other in a direction perpendicular to the plane of the mouth. Moreover, in their mutual engagement position, the connection means preferably perform the function of articulating one half-shell to the other so as to permit an opening pivoting movement of one half-shell relative to the other.

In particular, the connection means may form a buckle-type connection with a male element 12 or 14 and a female element 16 or 18 which are capable of a mutual form-fit, snap-engagement, or friction coupling and which are integral with the half-shells 2 and 4, respectively.

In one embodiment, the connection means comprise a male element 12 which is integral with the half-shell 2 and which extends from the periphery of the mouth of that half-shell and a female element 16 which is integral with the other half-shell 4. The male element 12, which is made of flexible and resilient plastics material, is preferably articulated to the body of the half-shell 2 by a film hinge 20 and has a generally anchor-like configuration with anchoring ends 22a, 22b which are bent at an acute angle. The female element 16 is defined by a bridge-like wall 26 which is integral with the half-shell 4 and which extends adjacent the collar 6 so as to delimit a cavity 24 which is open at its longitudinal ends. The anchor-like element 12 can be fitted in the cavity 24 as a result of resilient deformation of the bent ends 22a and 22b which, after their insertion, can engage the side walls 28 and 30 of the cavity 24 by returning resiliently.

Preferably, as shown in FIGS. 1 and 2, the male element is formed by a pair of parallel prongs 22 separated by a longitudinal slot 32 and each having an anchoring end 22a or 22b. Correspondingly, the female element 16 comprises inside the cavity 24, a guide rib 34 and a pair of projections or teeth 36 and 38 projecting from the side walls 28 and 30, respectively. In this preferred embodiment, the male element can be fitted in the female element with the guide rib 34 engaging the slot 32; when the male element 12 is fitted in the female element, the projections 36 and 38 act as locking elements which engage the ends 22a and 22b so that removal of the male element from the female element and separation of the two half-shells thus connected are prevented.

In any case, the connection is such that the male element 12 is movable inside the cavity 24, parallel to the rib 34, until the ends 22a and 22b engage the projections 36 and 38; it will be appreciated that this capability for movement in a direction perpendicular to the plane of the mouth facilitates the opening of the container from its closed configuration.

In the embodiment of FIG. 3, the male element 14 is constituted by a flexible tab which may be articulated, to the body of the half-shell, optionally with a film hinge, (broken line 20a in FIG. 3) and which has at its end a tooth or projection 40 which can be introduced into a bridge-like female element 18 integral with the half-shell 4. When the tab 14 is inserted in the female element 18 until the tooth 40 has passed the side wall 54 of the bridge 18, the tab 14 is movable, with a limited travel, in a direction perpendicular to the plane of the mouths of the two half-shells and its removal is prevented by the tooth 40 which comes into engagement with the side wall 54 of the bridge 18.

In the embodiments shown, the connection means form, in general, a permanent connection between the two half-shells, that is, a connection which is not easily releasable by the user, in particular, by a child.

According to a further, optional characteristic of the invention, the container is provided with means which facilitate its opening. These means comprise a thin, flexible tab 42 (FIG. 5) which is integral with the half-shell 4 and which is connected at 44, optionally by a film hinge, to a portion of the periphery of the mouth of the collar 6 which is intended to be inserted inside the mouth of the half-shell 2. In the closed configuration of the container, the tab 42 extends along the wall of the half-shell 4 with a portion 46 of its surface interposed between the wall of the collar 6 and a portion of the wall of the other half-shell 2, adjacent the mouth. In FIG. 5, the chain line 48 illustrates the position in which the periphery of the mouth of the half-shell 2 is situated when it is associated with the half-shell 4 in the closure position.

The container can easily be opened, starting from the closed configuration of FIG. 4, by gripping and lifting the end of the tab 42 in the direction of the arrow F of FIG. 4. This operation brings about disengagement of the mouth of the half-shell from the collar 6 of the half-shell 4.

Since, in the closed configuration of the container, the half-shell 2 is articulated to the other half-shell about the film hinge or bend line 20 or 20a which, in this configuration, is flush with a shoulder 50 of the collar 6, the lifting of the tab 42 permits an opening pivoting movement of the half-shell 2 relative to the half-shell 4. Moreover, since, even in the mutual engagement position, the connection means between the two half-shells permit movement of the half-shell 2 relative to the half-shell 4 in the direction perpendicular to the plane of the mouth with a travel almost corresponding to the depth of the collar 6 or, rather, corresponding to the distance between the shoulder 50 and the engagement rib 10 of the collar, the opening of the container to permit removal of the articles contained therein is further facilitated.

A band 52 formed by a film of heat-shrinkable plastics material may advantageously be associated with the closed container, so as to surround the joining region between the two half-shells and to be superimposed on the connection means 12 and 16 or 14 and 18 and at least partially superimposed on the tab 42, when a tab 42 is present. The band has the function of further ensuring the anchorage between the two half-shells of the container and may also be used to receive informative printed inscriptions, avoiding the use of an explanatory slip inside the container.

By virtue of the characteristics described above, the container according to the invention is more compact and manageable and can easily be controlled and handled by the user.

It is intended that, the principal of the invention remaining the same, the forms of embodiment and details of construction may be varied widely with respect to those described and illustrated, without departing from the scope of the appended claims. Thus, for example, it is intended that other connection means which achieve the same functional capabilities described above may advantageously be used.

Similarly, the shape of the container and of the two half-shells described above with reference to the configuration described in WO93/00267 may be varied to include other shapes such as, for example, a generally egg-shaped configuration formed by two half-shells coupled in an equatorial plane or by two half-shells coupled in a meridian plane of the container.

Moreover, the term half-shell, as used in this description is not intended to be limited to half-shells with marked concavity and having a containing function but is also intended to include the situation in which at least one of the two half-shells is of generally flattened shape, performing substantially the function of a cover for the other half-shell.

The invention claimed is:
1. A container for gifts, comprising:
a first half-shell and
a second half-shell,
   said first and second half-shells comprising:
   an engagement means suitable to promote a firm connection of the two half-shells in a mouth-to-mouth relationship to form a closed container suitable for holding gifts, said engagement means providing a form-fit or snap engagement between said first half-shell and second half-shell and being releasable by the user,
   a connection means being associated with each of the half-shells and being susceptible to be mutually engaged in order to keep the two half-shells connected to one another, when said engagement means are disengaged, said connection means comprising buckle-like connection means comprising:
   a male element integral with said first half-shell connected to said first half-shell by articulation means and
   a female element integral with said second half-shell,
   wherein said articulation means, in the configuration of a mutual engagement of said connection means permitting an opening pivoting movement of one half-shell relative to the other half-shell,
   wherein said connection means connect the two half-shells to one another in a manner such as to permit a limited movement of one half-shell relative to the other in a direction perpendicular to the plane of the mouth of the two half-shells, said male element having a generally anchor-shaped configuration with resilient anchoring ends and comprising a pair of substantially parallel, resilient prongs separated by a slot and
   wherein said female element is formed by a bridge-like wall defining an open-ended slot in which the male element can be inserted and wherein said anchoring ends can engage the sidewalls delimiting the open-ended slot,
   said female element comprising a guide rib which can be inserted in said slot between the prongs and wherein the female element comprises projecting engagement means which can cooperate with said anchoring ends of said prongs to prevent removal of the male element from the female element.

2. A container according to claim 1, characterized in that it comprises means for facilitating the opening of the container, comprising a flexible tab (42) connected to the periphery of the mouth of one of the half-shells (4), the other half shell (2) being capable of being superimposed on the end of the tab in the region of its connection to the respective half-shell, in the closed configuration of the container.

3. A container according to claim 1, further comprising a heat-shrinkable band (52) surrounding the connection region between the two half-shells.

4. A container according to claim 1, said engagement means comprising an engagement rib on one of said half-shells and an collar on the other of said half-shells, wherein the movement of the connection means in a direction perpendicular to the plane of the mouth of the two half-shells corresponds to the depth of said collar.

5. A package comprising a hollow body including in its interior a container (1) according to claim 1.

6. A package-according to claim 5, characterized in that the hollow body is a chocolate egg.

\* \* \* \* \*